US012270517B1

(12) United States Patent
Rawlyk

(10) Patent No.: US 12,270,517 B1
(45) Date of Patent: Apr. 8, 2025

(54) SMART WATERLESS FOUNTAIN

(71) Applicant: Gordon Rawlyk, Jacksonville, FL (US)

(72) Inventor: Gordon Rawlyk, Jacksonville, FL (US)

( * ) Notice: Subject to any disclaimer, the term of this patent is extended or adjusted under 35 U.S.C. 154(b) by 0 days.

(21) Appl. No.: 18/810,090

(22) Filed: Aug. 20, 2024

Related U.S. Application Data

(60) Provisional application No. 63/587,496, filed on Oct. 3, 2023.

(51) Int. Cl.

| | |
|---|---|
| ***F21L 14/04*** | (2006.01) |
| ***F21V 23/00*** | (2015.01) |
| ***F21V 23/04*** | (2006.01) |
| ***F21V 33/00*** | (2006.01) |
| ***F21W 121/02*** | (2006.01) |
| ***F21Y 107/00*** | (2016.01) |
| ***F21Y 115/10*** | (2016.01) |
| ***H04R 1/02*** | (2006.01) |

(52) U.S. Cl.
CPC ............ *F21L 14/04* (2013.01); *F21V 23/009* (2013.01); *F21V 23/0435* (2013.01); *F21V 33/0056* (2013.01); *H04R 1/028* (2013.01); *F21W 2121/02* (2013.01); *F21Y 2107/00* (2016.08); *F21Y 2115/10* (2016.08); *H04R 2420/07* (2013.01)

(58) Field of Classification Search
CPC .............. F21L 14/04; F21V 23/00–009; F21V 23/0435; F21V 33/0056; F21V 33/006; F21W 2121/02; F21Y 2107/00–30; F21Y 2115/10; H04R 1/028; H04R 2420/07
See application file for complete search history.

(56) References Cited

U.S. PATENT DOCUMENTS

| | | | | |
|---|---|---|---|---|
| 6,971,779 B2 * | 12/2005 | Tau | G09F 19/02 | 362/555 |
| 8,056,275 B2 | 11/2011 | Ballew | | |
| 2013/0186346 A1 * | 7/2013 | Milford | A01K 63/006 | 119/245 |
| 2014/0334648 A1 * | 11/2014 | Wang | H05B 47/195 | 315/186 |

FOREIGN PATENT DOCUMENTS

| | | | |
|---|---|---|---|
| CN | 207768361 | U | 8/2018 |
| CN | 108027596 | B | 4/2021 |
| CN | 114594710 | A | 6/2022 |
| ES | 2934308 | T3 | 2/2023 |
| TW | M256719 | U | 2/2005 |
| WO | 2020199319 | A1 | 10/2020 |

* cited by examiner

*Primary Examiner* — Jason M Han
(74) *Attorney, Agent, or Firm* — John Rizvi; John Rizvi, P.A.—The Patent Professor ®

(57) ABSTRACT

A waterless fountain and a kit for converting a recirculating water fountain to a waterless fountain that improve performance and reduces maintenance requirements for fountains while maintaining or improving overall aesthetics. The waterless fountain includes a fountain body, a light diffuser, a plurality of light emitting diodes (LEDs) connected to the fountain body, and a system controller that uses and controls the plurality of LEDs and the light diffuser for producing a simulated flowing water display on at least a portion of the fountain body. The waterless fountain and kit provide a high degree of adaptability and versatility in a waterless fountain design while also providing an aesthetically pleasing visual and significantly reducing overall maintenance requirements as compared to a traditional recirculating water fountain.

9 Claims, 7 Drawing Sheets

SMART WATERLESS FOUNTAIN

This application claims the benefit of U.S. Provisional Patent Application No. 63/587,496 filed Oct. 3, 2023, which is hereby incorporated by reference herein in its entirety.

FIELD OF THE INVENTION

The present invention relates generally to water features, and more particularly, to a smart waterless fountain that substantially reduces maintenance requirements by the lack of water use.

BACKGROUND OF THE INVENTION

The general concept of fountains and fountain displays is well established in the art. Fountains have existed from the earliest recorded history and have been the subject of substantial creativity and artistic expression. Early fountains were often intricately sculptured and replete with various sculpted figures and sculpted objects. These earliest fountains were typically gravity powered in that water from a higher location was allowed to flow downwardly across the fountain structure in what is generally describable as a cascade. With the availability of pumping devices, fountains and fountain displays provide the added feature of water sprays or streams of upwardly or angularly directed water under pressure. Practitioners in the art placed considerable emphasis upon creativity in providing aesthetically pleasing flow patterns of sprays and water streams.

For example, the use of fountains and other types of water features are pervasive throughout architectural history, and landscape architecture and garden design. A water feature is a design element where open water performs an aesthetic or recreational function. Some water features are lotic (i.e., flowing, like a stream) while others are lentic (i.e., stagnant, non-flowing, like a pond or pool of water). The use of moving water as a therapeutic and products that include the soothing qualities of moving water have historically been quite popular. For example, individuals increasingly desire to place water fountains utilizing these soothing water movements in their homes and at their places of business. There exist many fountain types of fountain designs including, but not limited to, outdoor garden-type fountains and tabletop fountains modern for use with commercial and residential fountains that reflect modern tastes and application. As with most mechanical devices, regular maintenance is necessary in order to maintain the water fountain's operability. Typically, water features require regularly cleaning, draining, refilling and cleaning the pump, emptying any bowl feature to scrub away scale or algae build-up, adding algae prevention chemicals, and ensuring the water supply is topped off and/or regularly replaced. In addition, many water fountains are often replete with problems such as requiring complicated assembly, splashing, leaking, and overall noisy operation. Some fountains cannot be used inside as well as outside, and many fountains having a recirculating-type pump are often only equipped with one setting. As a result, variable water flow rates are not easily obtained. In addition, in many instances where a significant amount of water is being circulated, the loud noise created by the falling water can sometimes become more of a distraction and decrease from the soothing effects of the fountain's intended purpose. Therefore, there exists a need for durable and reduced maintenance water feature that also takes advantages of modern design components.

Accordingly, there is need for a water feature that improves performance and reduces maintenance requirements of fountains while maintaining or improving overall aesthetics.

SUMMARY OF THE INVENTION

The present invention is directed to a waterless fountain and conversion kit that improves performance and reduces maintenance requirements for fountains while maintaining or improving overall aesthetics.

In a first implementation of the invention, a waterless fountain is provided that improves performance and reduces maintenance requirements while maintaining or improving overall aesthetics. The waterless fountain comprising:

- a fountain body;
- a light diffuser;
- a plurality of light emitting diodes (LEDs) connected to the fountain body; and
- a system controller that uses and controls the plurality of LEDs and the light diffuser for producing a simulated flowing water display on at least a portion of the fountain body.

In a second implementation, a kit is provided for converting an existing recirculating water fountain to a waterless fountain that improves performance and reduces maintenance requirements for fountains while maintaining or improving overall aesthetics. The kit comprising:

- a light diffuser adapted to connect with a body of the recirculating water fountain;
- a plurality of light emitting diodes (LEDs) adapted to be connected to the body of the recirculating water fountain; and
- a system controller adapted to mounting on or within the body of the recirculating water fountain and wherein the system control uses and controls the plurality of LEDs and the light diffuser for producing a simulated flowing water display on at least a portion of the body of the recirculating water fountain.

In a third aspect, a smart waterless fountain application (alternatively referred to herein as an "app") is provided that may be executed on a user device such that waterless fountain is capable of being responsive to and controlled by the application executed.

In a fourth aspect, the system controller uses a plurality of lighting patterns using the plurality of LEDs for the producing of the simulated flowing water display.

In another aspect, the waterless fountain further comprises at least one speaker for producing an audio stream playback.

In another aspect, the systems controller further comprises a transceiver that facilitates wireless communications between the system controller and an external user device.

In another aspect, the external device is a smartphone.

In another aspect, the waterless fountain further comprises a plurality of water containers attached to and protruding from the fountain body.

In another aspect, the simulated flowing water display flows through each water container of the plurality of water containers.

In another aspect, the simulated water flow display changes colors.

In another aspect, the simulated water flow display has a varying light intensity.

In another aspect, each digital visual panel and/or each one display viewing area of the plurality of display viewing areas is configured for displaying specific content.

In another aspect, the waterless fountain and/or the kit further comprise a base comprising a plurality of wheels for attachment to a fountain body.

In another aspect, the fountain body is constructed from a material comprising at least one of plastic, weathered steel, stone, marble, cement or ceramic tile.

In another aspect, the system controller further comprises:

a processor; and a memory storing instructions that when executed cause the processor to perform operations comprising:

receiving illumination instructions;

receiving audio playback instructions; and executing the illumination instructions and the audio playback instructions in the producing of the simulated flowing water display through the light diffuser on at least a portion of the fountain body and producing an audio playback through the at least one speaker.

In another aspect, the audio stream playback produces a flowing water sound.

The methods and systems described herein can be implemented by data processing systems, such as one or more smartphones, tablet computers, desktop computers, laptop computers, smart watches, wearable, audio accessories, on-board computer, and other user devices and consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the detailed description below.

The methods and systems described herein can be implemented by data processing systems, such as one or more smartphones, tablet computers, desktop computers, laptop computers, smart watches, wearable, audio accessories, on-board computer, and other user devices and consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
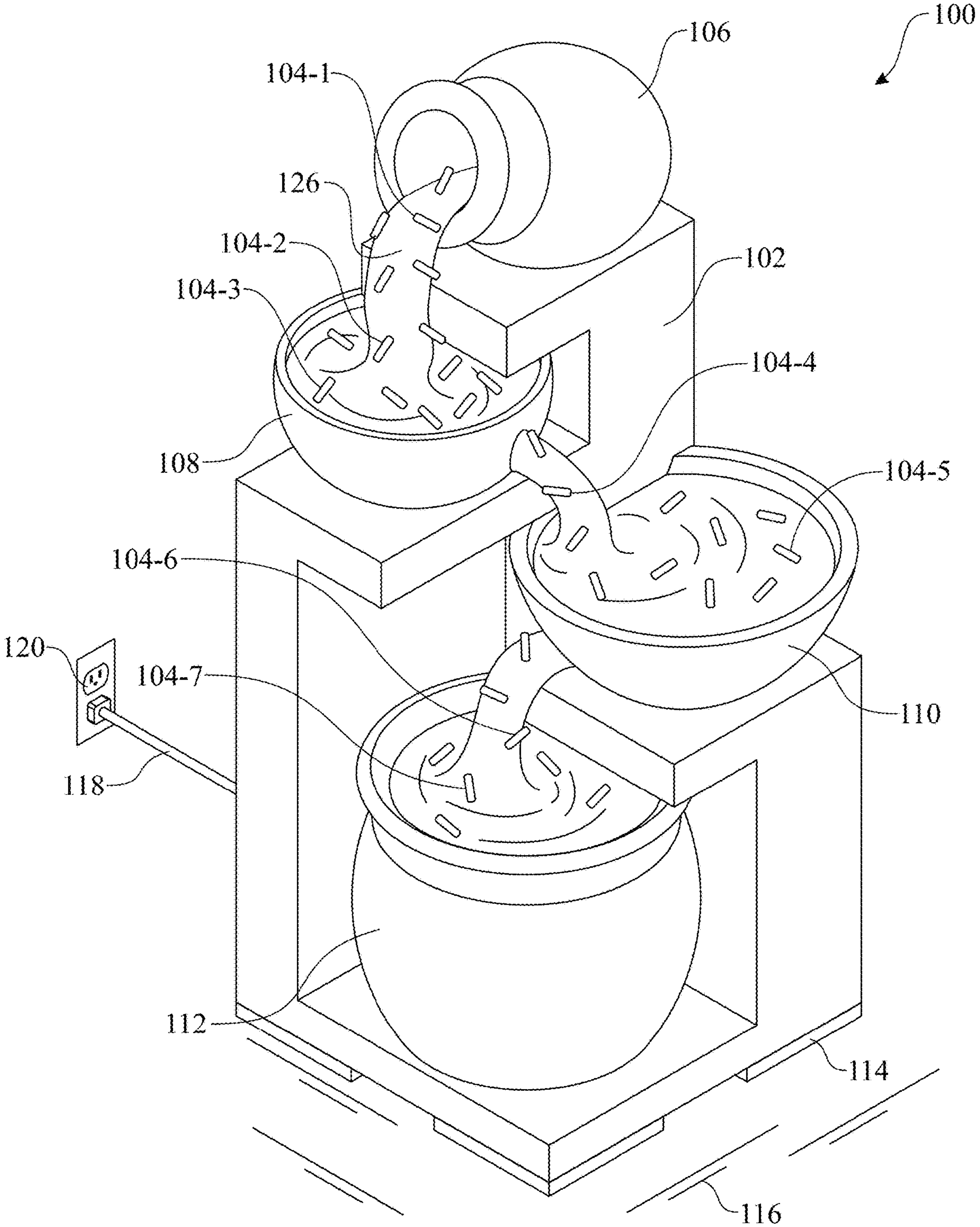
FIG. 1 presents a perspective frontside view of a waterless fountain in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the Figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a waterless fountain and a kit for converting an existing recirculating water fountain to a waterless fountain that improve performance and reduces maintenance requirements for fountains while maintaining or improving overall aesthetics. More particularly, the principles of the disclosed embodiments are directed to a waterless fountain comprising at least a fountain body; a light diffuser; a plurality of light emitting diodes (LEDs) connected to the fountain body; and a system controller that uses and controls the plurality of LEDs and the light diffuser for producing a simulated flowing water display on at least a portion of the fountain body. As such, the waterless fountain of the disclosed embodiments—and a kit for converting an existing recirculating water fountain to a waterless fountain—provides for a high degree of adaptability and versatility in a waterless fountain design while also providing an aesthetically pleasing visual and significantly reducing overall maintenance requirements as compared to a traditional recirculating water fountain. Thus, the disclosed embodiments address problems with water fountain problems with respect to high maintenance requirements and associated costs. Further, a smart waterless fountain application is provided such that the waterless fountain is capable of being responsive to and controlled by the smart waterless fountain application executing on a user device thereby providing advantageous improvement of practical applications that include water fountain hardware and/or water fountain applications. Further, advantageously, the waterless fountain herein allows for the use and enjoyment of fountains in locations previously unsuitable (e.g., water sensitive areas or areas difficult to perform maintenance).

Figure 2:
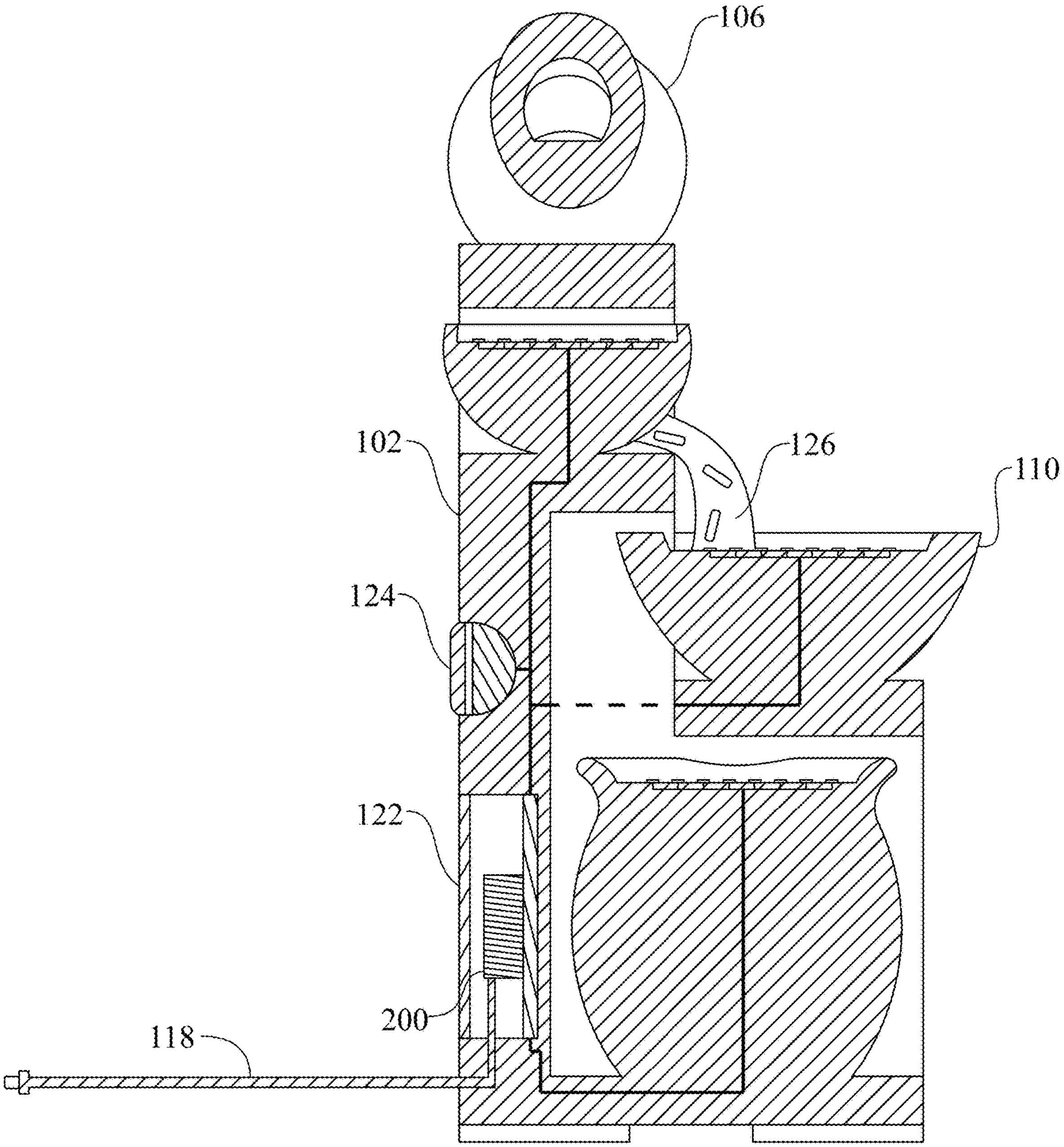
FIG. 2 presents a cross-sectional view of the waterless fountain of FIG. 1 in accordance with an embodiment.
Figure 3:
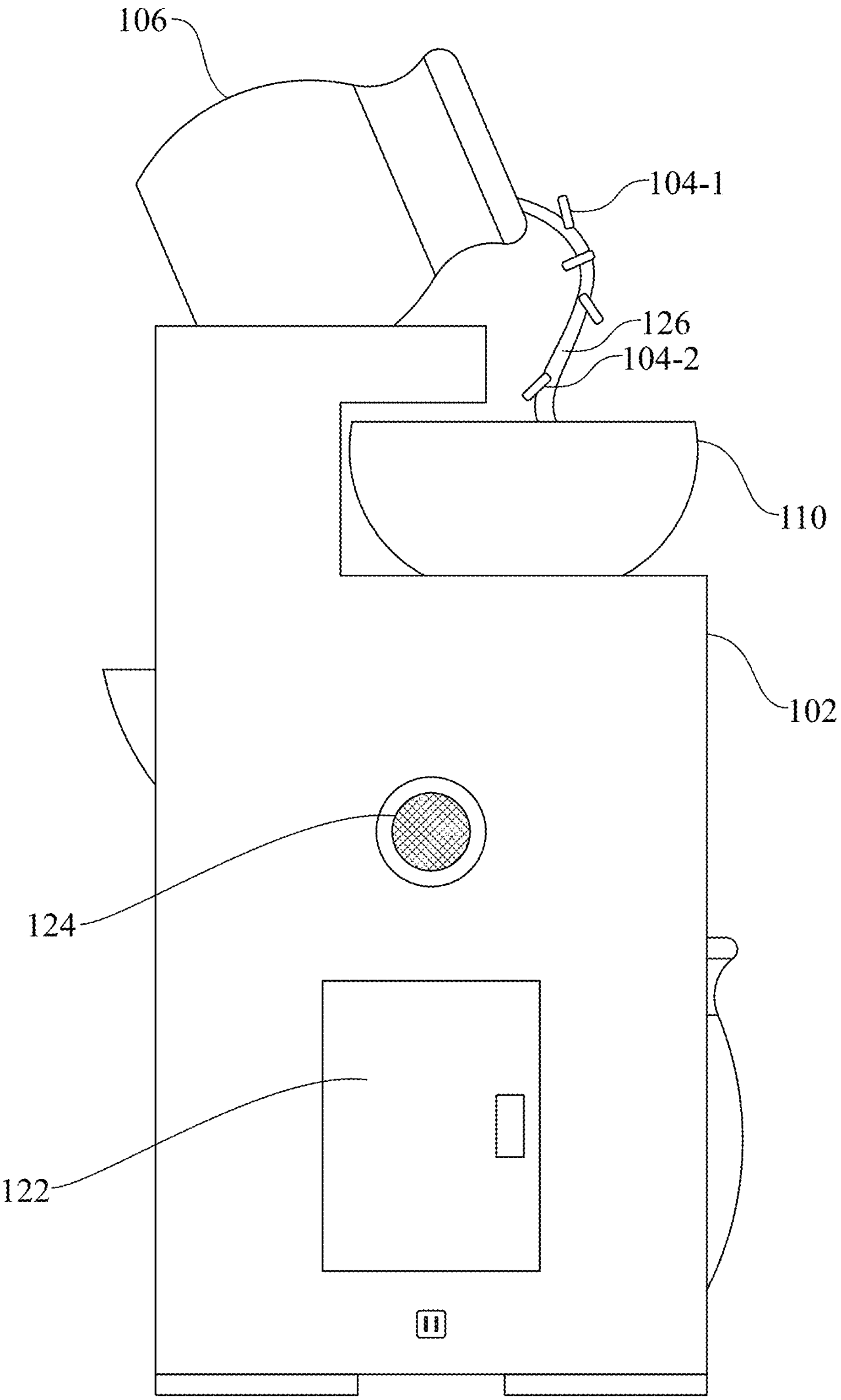
FIG. 3 presents a backside view of the waterless fountain of FIG. 1 in accordance with an embodiment.

Turning our attention to FIGS. 1 through 3 which will now discussed together, FIG. 1 presents a perspective frontside view of a waterless fountain 100 in accordance with an embodiment, FIG. 2 presents a cross-sectional view of the waterless fountain 100, and FIG. 3 presents a backside view of the waterless fountain 100. More particularly, the waterless fountain 100 comprises a fountain body 102, a light diffuser 126, a plurality of LEDs (e.g., a series of LEDs interconnected together comprising LEDs 104-1, 104-2, 104-3, 104-4, 104-5, 104-6, and 104-7) and a system controller 200 (see also FIG. 4). Illustratively, the plurality of LEDs will utilize a plurality of lighting patterns for producing a simulated water flowing display the control of the system controller 200. The system controller 200 (see also FIG. 4) may be integrated within the fountain body 100 (e.g., behind access panel 122) or external to the fountain body 100 depending upon the desired design. As will be appreciated by one skilled in the art, the fountain body 102 may take a variety of shapes, sizes and configurations that are wholly consistent with the principles of the disclosed embodiments including, but not limited to, the fountain body 102 shown in FIG. 1, for example. In an aspect, the fountain body 100 may further comprise a plurality of water containers (e.g., water container 106, water container 108, water container 110, and water container 112) such that the simulated flowing water display appears to flow through each water container of the plurality of water containers. In an aspect, the simulated water flow may change colors and/or have a varying light intensity thereby providing the user with a variety of possibilities to create the desired lighting effect and soothing impact of the waterless fountain in a particular surrounding (e.g., a meditation area). Also, while the instant embodiment utilizes LEDs it will be understood that any light source providing the same lighting characteristics, qualities, and specifications may be used. Optionally, the waterless fountain may further comprise base 114 that stabilizes the waterless fountain 100 on flat surface 116 (e.g., a tile floor). The base 114 may comprise a plurality of wheels (not shown) attached thereto allowing for movement of the waterless fountain 100 to different areas (e.g., from one room to another room). In aspect, the waterless fountain 100 may further comprise at least one speaker 124 through which an audio stream playback may be produced and broadcast from the waterless fountain 100 (e.g., the sound of a soothing and flowing water stream). Thus, the waterless fountain 100 is capable of providing a visual and auditory experience to the user.

Figure 4:
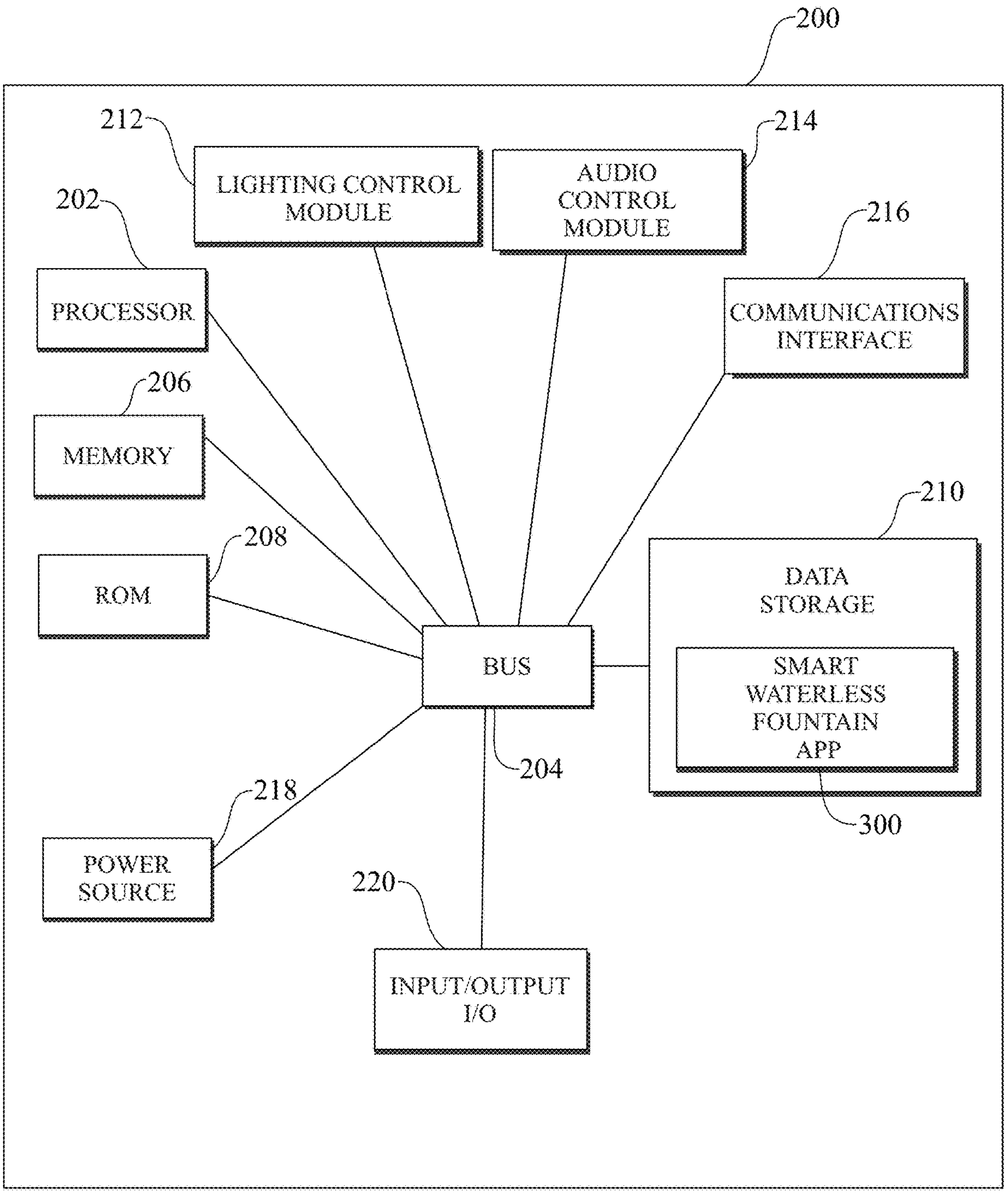
FIG. 4 presents a block diagram of a system controller for a waterless fountain in accordance with an embodiment.

Turning our attention to FIG. 4, an illustrative configuration for the system controller 200 of the waterless fountain 100 is shown in accordance with an embodiment. As shown, the system controller 200 comprises processor 202 coupled with bus 204 for executing program code (e.g., the smart waterless fountain app 300; see also FIG. 5) and communications interface 216 for managing communications to and from the system controller 200, memory 206 and/or read-only memory (ROM) 208 for storing program code and data, and power source 218 for powering the system controller 200. The operations performed by for the system controller 200 in combination with the smart waterless fountain app 300, for example, provide for managing and controlling the waterless fountain 100 and producing the visual and/or auditory characteristics thereof. Further, the system controller 200 may be used to define operational schedules for the waterless fountain 100 such that the fountain may be activated and de-activated at times of the user's choosing thereby reducing overall power consumption and reducing wear-and-tear. Communication interface 216 is configured for enabling two-way wireless communications from and to the waterless fountain 100. For example, between an individual's user device 400 (see, FIGS. 6 and 7). The user device 400 may also be used to control the waterless fountain 100 by executing an application (e.g., the smart waterless fountain app 300). In an aspect, the waterless fountain 100 may be activated and/or deactivated using voice commands that are recognized by the system controller 200. Lighting control module 212 provides for managing and controlling the plurality of LEDs for producing the desired simulated water flow display. In an aspect, sequential lighting patterns may be utilized thereby producing the appearance of an imitation water flow. Further, the simulated water flow display is capable of being used in a range of low to high ambient room lighting conditions. Audio control module 214 provides for managing and controlling the delivery of audio by and through the speaker(s) 124. The system controller 200 may also include one or more input/output devices 220 that enable user interaction with the user device 400 The input/output devices may include connection for an external power source (e.g., power source 120 and power cord 118) and peripherals, such as an NFC device (e.g., NFC tag reader), printer, scanner (e.g., a QR-code scanner), touchscreen display, etc.

Figure 7:
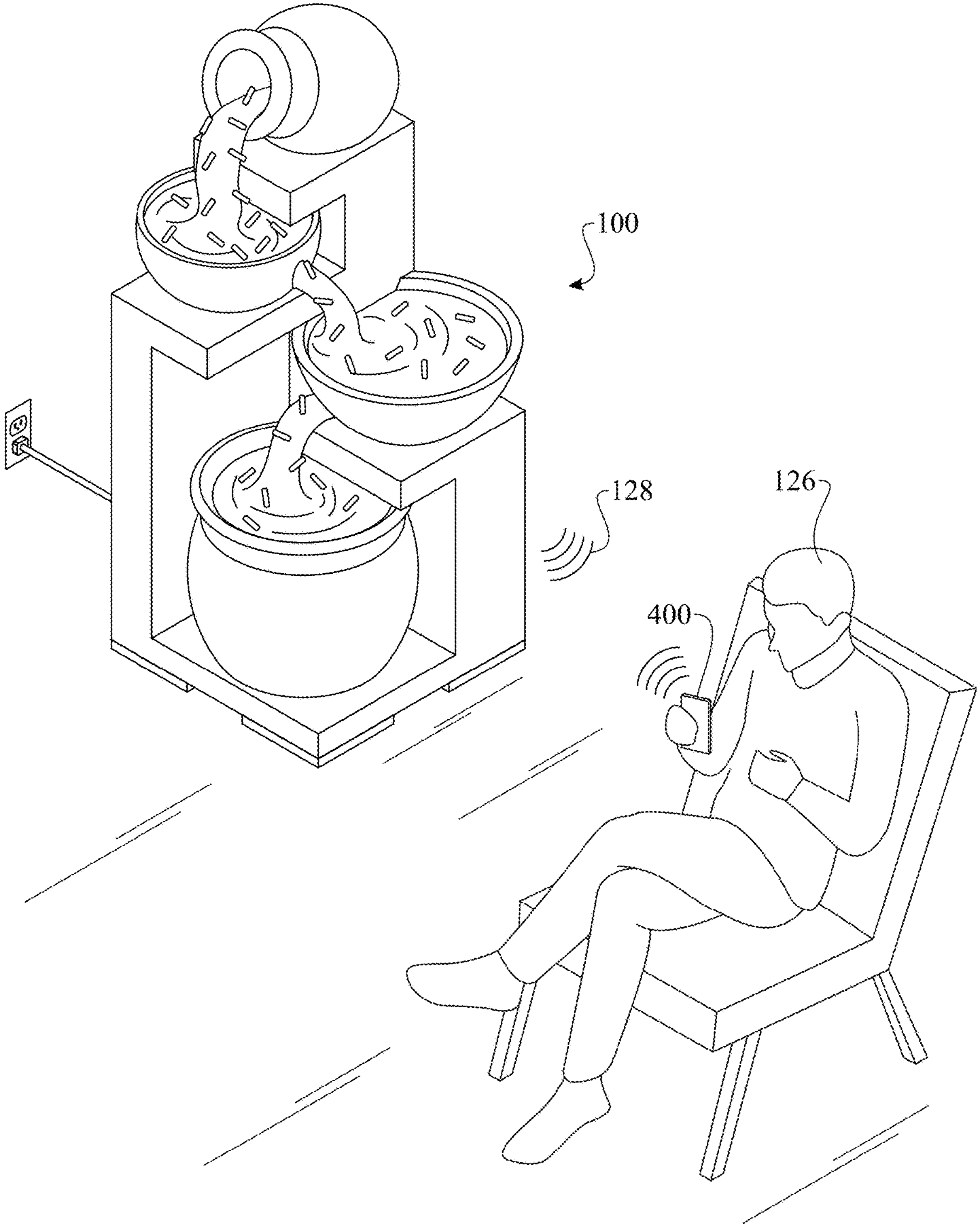
FIG. 7 presents an illustrative example of a user interacting with a waterless fountain in accordance with an embodiment.

The communications interface 216 may be used to facilitate communications across communications links (e.g., communications links 128 as shown in FIG. 7) over a suitable communications network. This may take the form, for example, of a wide area network connection that communicatively couples the system controller 200 with well-known access points which may be a cellular communications service. Similarly, communications managed by the communications interface 216 may take the form, for example, of a local Wi-Fi network interface, Bluetooth interface or Ethernet interface the communicatively couples the system controller 200 with the well-known Internet, a local area network (LAN), and ultimately the user device 400. Electronic communications by and through system controller 200 between the various systems, networks, devices, users, entities, and/or individuals are facilitated by the communications links in accordance with any number of well-known communications protocols and methods (e.g., wireless communications).

Figure 5:
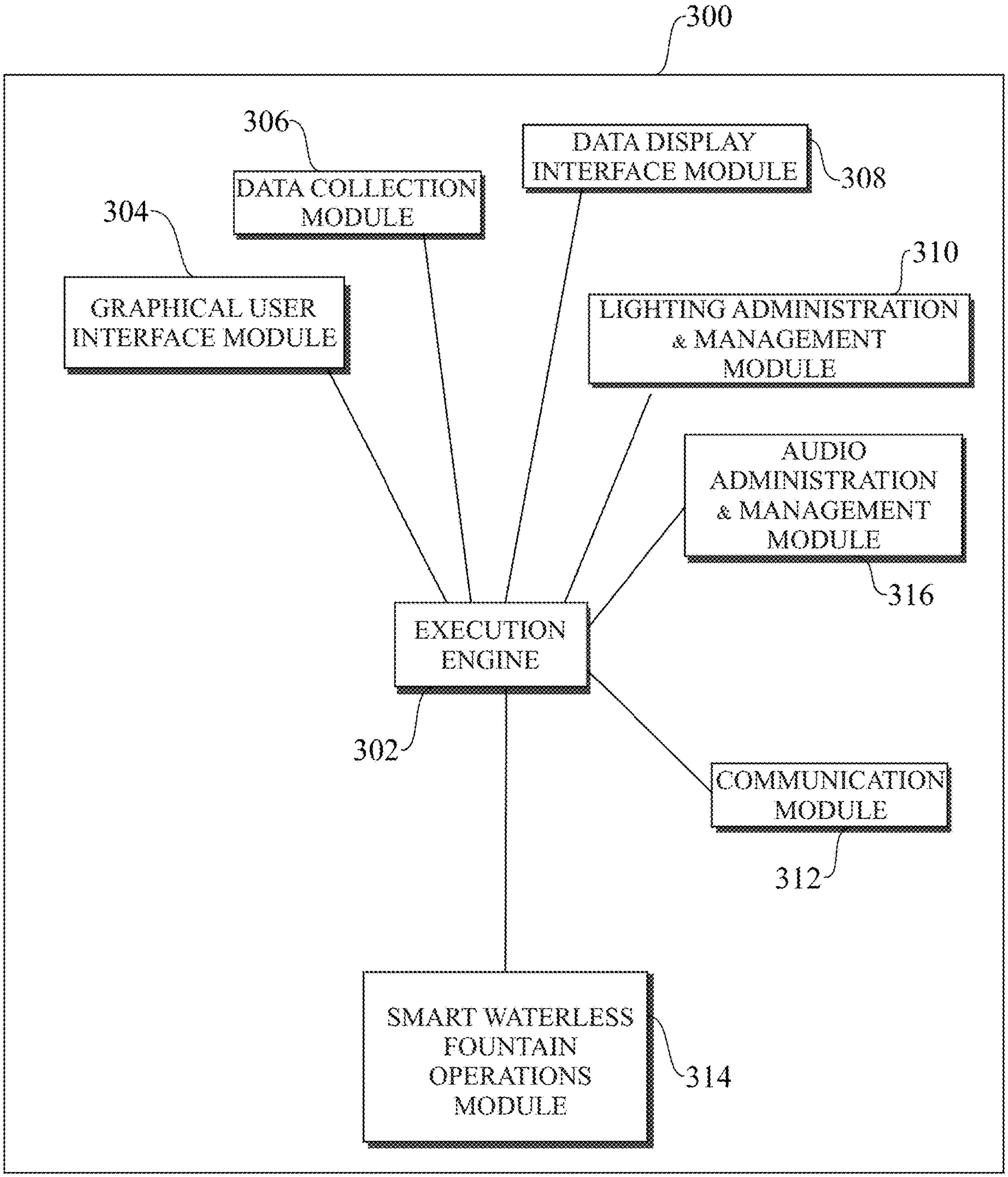
FIG. 5 presents an illustrative architecture for a smart waterless fountain app in accordance with an embodiment in accordance with an embodiment.

Turning our attention to FIG. 5, an illustrative architecture for the operation of the smart waterless fountain app 300 is presented in accordance with an embodiment. As will be appreciated, the architecture may be used, illustratively, in conjunction with a cloud network services architecture or other communications network, the system controller 200, and/or the user device 400 for launching and executing the smart waterless fountain app 300 and its associated operations. As shown, the architecture for the operations of the smart waterless fountain app 300 provides several interfaces and engines used to perform a variety of functions such as the collection, aggregation, manipulation, processing, analyzing, verification, authentication, and display of applicable real-time information and data that are useful to realize the delivery of the waterless fountain operations of the disclosed embodiments. More particularly, data display interface module 308 and communications module 312 are used to facilitate the input/output and display of electronic data and other information to, illustratively, the users employing the user device 400 (e.g., a touch screen) and executing the smart waterless fountain app 300. The lighting administration and management module 310 will facilitate the production and management of the simulated water display(s) and audio transmissions, as detailed above, from the waterless fountain 100 through the plurality of LEDS and the speaker(s) 124. The communications module 312 will also facilitate communications by and through the system controller 200, for example.

Execution engine 302 may be employed to deliver the waterless fountain operations herein through the execution of the smart waterless fountain app 300. In such delivery, the execution engine 302 will operate and execute, as further detailed herein below, with at least the following program modules: graphical user interface module 304, data collection module 306, data display interface module 308, lighting administration and management module 310, communications module 312, smart waterless fountain operations module 314, and audio administration and management module 316. The operations executed by each and every of the foregoing modules are, for example, as discussed through this disclosure.

Those skilled in the art will appreciate that the present disclosure contemplates the use of systems configurations and/or computer instructions that may perform any or all of the operations involved in the waterless fountain services herein. The disclosure of computer instructions that include, for example, the smart waterless fountain app 300 and the system controller 200 instructions is not meant to be limiting in any way. Those skilled in the art will readily appreciate that stored computer instructions and/or systems configurations may be configured in any way while still accomplishing the various goals, features, and advantages according to the present disclosure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. Accordingly, the applications and programs, for example, may be written using any number of programming languages and/or executed on compatible platforms including, but not limited to, JavaScript, PHP (PHP: Hypertext Preprocessor), WordPress, Drupal, Laravel, React.js, Angular.js, and Vue.js. Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions (e.g., non-transitory computer readable mediums) may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including LANs, wide area networks (WANs), through the Internet (e.g., using an Internet Service Provider), or the connection may be made to external computers.

Figure 6:
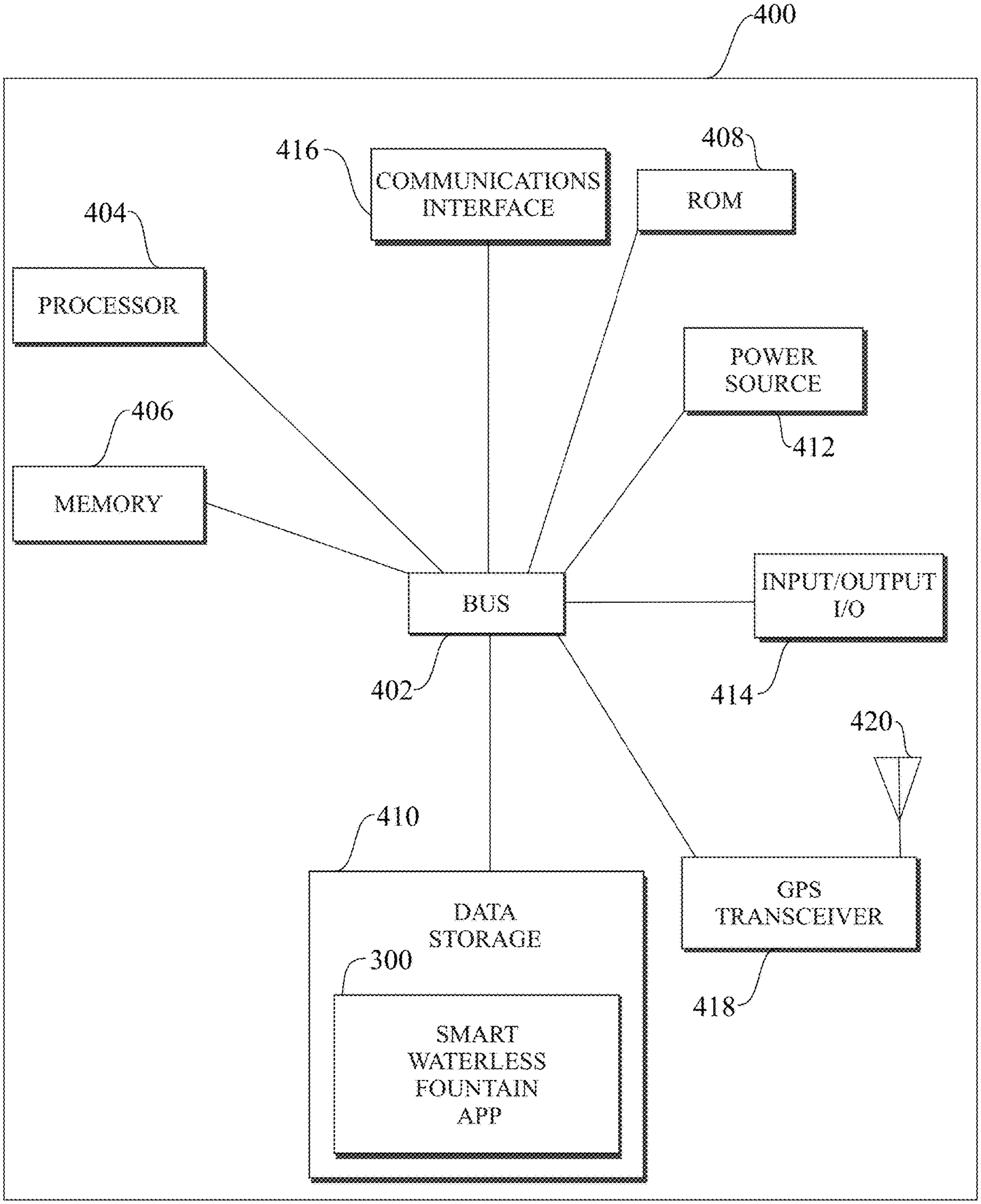
FIG. 6 presents a presents a block diagram of a user device configured for use with a waterless fountain in accordance with an embodiment.

Turning our attention to FIG. 6, an illustrative user device 400 is shown configured in accordance with an embodiment. The user device 400 typically includes bus 402 and processor 404 coupled to the bus 402 for executing operations and processing information. As will be appreciated, a "user device" in the context herein may comprise a wide variety of devices such as any type of hardware device, mobile devices, smartphones, laptop computers, desktop computers, tablets, and wearable devices, to name just a few, that execute applications (e.g., a mobile application) in accordance with the principles of the disclosed embodiments herein. For example, the execution of the smart waterless fountain app 300 as discussed herein. The processor 404, as powered by power source 412, may include both general and special purpose microprocessors, and may be the sole processor or one of multiple processors of the device. This is equally applicable to the processor 202 of FIG. 4. Further, the processor 404 (or the processor 202) may comprise one or more central processing units (CPUs) and may include, be supplemented by, or incorporated in, one or more application-specific integrated circuits (ASICs) and/or one or more field programmable gate arrays (FPGAs).

The user device 400 may also include memory 406 coupled to the bus 402 for storing computer-readable instructions to be executed by the processor 404. The memory 406 may also be utilized for storing temporary variables or other intermediate information during the execution of the instructions by the processor 404. The user device 400 may also include ROM 408 or other static storage device coupled to the bus 402. Further, data storage device 410, such as a magnetic, optical, or solid-state device may be coupled to the bus 402 for storing information and instructions for the processor 404 including, but not limited to, the smart waterless fountain app 300. Data storage device 410 (or the data storage device 210) and the memory 406 (and the memory 206) may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 400 may also include one or more communications interface 416 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 416 (or the communications interface 216) may be an integrated services digital network (ISDN) card or modem/router used to facilitate data communications of various well-known types and formats. Further, illustratively, the communications interface 416 (or the communications interface 216) may be a LAN card used to provide data communication connectivity to a comparable LAN. Wireless communication links may also be implemented. The Global Positioning System (GPS) transceiver 418 and antenna 420 facilitate delivery of location-based services in order to register the exact location of the user device 400, for example, as the user roams from one location to another location. As will be understood, the application herein will be able to track individual users and their location (and proximities to other locations) upon the launching of the application thereby enabling the well understood GPS location features of the user device 400 (e.g., a smartphone).

As will be appreciated, the functionality of the communication interface 416 (or the communications interface 216) is to send and receive a variety of signals (e.g., electrical, optical, or other signals) that transmit data streams representing various data types. The user device 400 may also include one or more input/output devices 414 that enable user interaction with the user device 400 such as a camera, display, keyboard, mouse, speakers, microphone, buttons, etc. The input/output devices 414 may include peripherals, such as an NFC device (e.g., NFC reader), camera, printer, scanner (e.g., QR-code scanner), touchscreen display, etc. For example, the input/output devices 414 may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 400 or an associated display device, for example.

Turning our attention to FIG. 7, an illustrative example of a user interacting with a waterless fountain in accordance with an embodiment. As shown, the user 126 may be in a position proximate to the waterless fountain 100 (e.g., in their office or living room) and may desire to activate the waterless fountain 100 in order to enjoy the visual, auditory and other therapeutic features delivered thereby. Illustratively, the user 126 may activate the waterless fountain directly from their user device 400 that may be executing the smart waterless fountain app 300 that will enable communications between the user device 400 and the waterless fountain 100 over the communications links 128. Once activated, the user 126 has complete control over the waterless fountain 100 and may customize features such as lighting and audible sounds to meet their current desires in their ambient environment.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention. A description of an embodiment with several components in communication with each other does not imply that all such components are required. On the contrary, a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. "Software" may refer to prescribed rules to operate a computer. Examples of software may include code segments in one or more computer-readable languages; graphical and or/textual instructions; applets; pre-compiled code; interpreted code; compiled code; and computer programs. A network is a collection of links and nodes (e.g., multiple computers and/or other devices connected together) arranged so that information may be passed from one part of the network to another over multiple links and through various nodes. Examples of networks include the Internet, the public switched telephone network, wireless communications networks, wired communications networks, and computer networks (e.g., an intranet, an extranet, a local-area network, or a wide-area network).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media. When a single device or article is described herein, it will be readily apparent that more than one device/article (whether or not they cooperate) may be used in place of single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The term “computer-readable medium” as used herein refers to any medium that participates in providing data (e.g., instructions) which may be read by a computer, a processor or a like device. Such a medium may take many forms, including but not limited to, non-transitory, non-volatile media, volatile media, and transmission media. Non-volatile media include, for example, optical or magnetic disks and other persistent memory. Volatile media include dynamic random access memory (DRAM), which typically constitutes the main memory. Transmission media includes coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, removable media, flash memory, a “memory stick”, any other memory chip or cartridge, a carrier wave as described hereinafter, or any other medium from which a computer can read. Various forms of computer readable media may be involved in carrying sequences of instructions to a processor. For example, sequences of instruction may be delivered from RAM to a processor, may be carried over a wireless transmission medium, and/or may be formatted according to numerous formats, standards or protocols, such as Bluetooth®, 4G, 5G, etc.

Where databases are described, it will be understood by one of ordinary skill in the art that alternative database structures to those described may be readily employed, and other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A “computer system” may refer to a system having one or more computers, where each computer may include a non-transitory computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units. A "network" may refer to a number of computers and associated devices that may be connected by communication facilities. A network may involve permanent connections such as cables or temporary connections such as those made through the telephone or other communication links. A network may further include hard-wired connections (e.g., coaxial cable, twisted pair, optical fiber, waveguides, etc.) and/or wireless connections (e.g., radio frequency waveforms, free space optical waveforms, acoustic waveforms, etc.). Examples of a network may include: an internet, such as the Internet; an intranet; a LAN; a wide area network (WAN); and a combination of networks.

As noted above, in some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a GUI, or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method(s) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A waterless fountain comprising:
- a fountain body;
- a base comprising a plurality of wheels, wherein the fountain body is fixedly connected to the base;
- a light diffuser;
- a plurality of light emitting diodes (LEDs) connected to the fountain body;
- at least one speaker;
- a system controller comprising:
  - a processor; and
- a memory storing instructions that when executed cause the processor to perform operations comprising:
  - receiving illumination instructions;
  - receiving audio playback instructions; and
  - executing the illumination instructions and the audio playback instructions for producing a simulated flowing water display through the light diffuser on at least a portion of the fountain body and an audio playback through the at least one speaker;
  - wherein the system controller uses and controls the plurality of LEDs and the light diffuser using a plurality of lighting patterns applied thereto for the producing of the simulated flowing water display on at least a portion of the fountain body; and
  - wherein the audio playback comprises at least one flowing water sound.

2. The waterless fountain of claim 1, wherein the system controller further comprises:
- a transceiver that facilitates wireless communications between the system controller and an external user device.

3. The waterless fountain of claim 2, wherein the external user device is a smartphone.

4. The waterless fountain of claim 1, wherein the waterless fountain further comprises:
- a plurality of water containers attached to and protruding from the fountain body.

5. The waterless fountain of claim 4, wherein the simulated flowing water display flows through each water container of the plurality of water containers.

6. The waterless fountain of claim 1, wherein the simulated water flow display changes colors.

7. The waterless fountain of claim 1, wherein the simulated water flow display has a varying light intensity.

8. The waterless fountain of claim 1, wherein the fountain body is constructed from a material comprises at least one of plastic, weathered steel, stone, marble, cement or ceramic tile.

9. The waterless fountain of claim 1, wherein the system controller is capable of being responsive to and controlled by an application executing on a user device.

* * * * *